United States Patent [19]

Kawai et al.

[11] 4,280,874
[45] Jul. 28, 1981

[54] NUCLEAR REACTOR CORE STRUCTURE WITH ZONES OF VARYING ENRICHMENT

[75] Inventors: Toshio Kawai, Machida; Junichi Yamashita; Jun Takamatsu, both of Hitachi, all of Japan

[73] Assignee: Hitachi, Ltd., Tokyo, Japan

[21] Appl. No.: 952,660

[22] Filed: Oct. 19, 1978

[30] Foreign Application Priority Data

Oct. 21, 1977 [JP] Japan ................. 52/126419

[51] Int. Cl.³ .............................................. G21C 3/30
[52] U.S. Cl. ....................................... 176/78; 176/68; 176/76
[58] Field of Search ....................... 176/68, 73, 76, 78

[56] References Cited

U.S. PATENT DOCUMENTS

| 3,122,484 | 2/1964 | Iskenderian | 176/93 BP X |
| 3,205,139 | 9/1965 | Stewart et al. | 176/93 BP X |
| 3,799,839 | 3/1974 | Fisher et al. | 176/73 X |

FOREIGN PATENT DOCUMENTS

| 2430492 | 1/1975 | Fed. Rep. of Germany | 176/93 BP |
| 2547791 | 5/1976 | Fed. Rep. of Germany | 176/93 BP |

OTHER PUBLICATIONS

Barth et al., *Power-Flattening Technique*, Nucleonics, May, 1965, pp. 72-73.

*Primary Examiner*—Peter A. Nelson
*Attorney, Agent, or Firm*—Craig and Antonelli

[57] ABSTRACT

The core of a nuclear reactor is constituted by two sorts of fuel assemblies: first fuel assemblies each of which contains both fissile material and gadolinea and second fuel assemblies each of which contains only the fissile material. The ratio of the number of the first fuel assemblies to that of the second fuel assemblies are selected to be 1:3. The enrichment of the fissile material is larger at the upper part of the reactor core than at the lower part of the same. The fuel assembly containing both of the fissile material and the gadolinea includes first fuel rods each of which contain both the fissile material and the gadolinea, and second fuel rods which contains only the fissile material. The number of the first fuel rods and the concentration of gadolinea are substantially in proportion to the power density at positions in the reactor core where the fuel assembly is placed.

15 Claims, 39 Drawing Figures

NUCLEAR REACTOR CORE STRUCTURE WITH ZONES OF VARYING ENRICHMENT

BACKGROUND OF THE INVENTION

The present invention relates to a structure of a nuclear reactor core and, more particularly, to a structure of a reactor core which can facilitate the operation of the nuclear reactor.

In the existing boiling water reactor (BWR), the reactivity and the power distribution in the core are controlled by means of control rods, flow rate of the coolant through the core and the gadolinea ($Gd_2O_3$) which is a burnable poison.

In a construction of a reactor core which provides reactivity and power distribution control relying upon the control rods, an extraordinarily large change in power peaking is caused when the control rods are extracted, resulting in a deteriorated soundness of the fuel rods. More specifically, the fuel assembly is constituted by a plurality of fuel rods each of which consists of $UO_2$ pellets (fuel pellets) packed in a cladding tube. As the power of the reactor is increased, the volume of the $UO_2$ pellet is increased due to swelling and thermal expansion so that the diameter of the $UO_2$ pellet is increased at both ends thereof. Consequently, the $UO_2$ pellet is deformed so as to contact at its central portion. When the deformed $UO_2$ pellet contacts the wall of the cladding tube, a Pellet Cladding Mechanical Interaction (PCMI) is caused, often incurring a danger of breakage of the cladding tube. The possibility of the breakage of the cladding tube is large especially when the withdrawal of the control rods in the core is made while the reactor is operated to produce a high power.

A countermeasure which has been taken conventionally for securing the soundness of the fuel rod will be described hereinunder with specific reference to a boiling water reactor. The core of the boiling water reactor is usually constituted by fuel assemblies having an uniform axial enrichment distribution. The increase of the power of this reactor is initiated by withdrawing the control rods, which have been inserted into the core, until the density of the control rods in the core reaches 20%. This density of the control rod corresponds to the linear heat generation rate at which the PCMI is commenced, and the withdrawal of the control rods beyond this control rod density may incur the breakage of the fuel rods. It is therefore essential to stop the withdrawal of the control rods when the density thereof in the core has decreased to 20%. Then, the flow rate of the cooling water flowing through the reactor core is gradually increased to increase the power to a preselected level at a rate smaller than the critical rate as shown in U.S. Pat. No. 4,057,466 at which the PCMI is caused. The reduction of the power of the nuclear reactor due to an elapse of time is prevented, as disclosed in U.S. Pat. No. 762,248, by an increase of the flow rate of the cooling water so that the power of the nuclear reactor is maintained at a preselected level. When the reactor core is operated with a constant density of control rods, an uneconomical exposure assymmetry is caused. In order to avoid this, it is necessary to effect a change of the control rod pattern as shown in U.S. Pat. No. 762,248 once in a period of from a month to two months. The change of the control rod pattern cannot be made when the reactor is operated at high power, because such a change necessitates the withdrawal of the control rods. Therefore, the change of the control rod pattern is made by withdrawing the control rods while reducing the flow rate of the cooling water and decreasing the power down to the level below the linear heat generation rate at which the PCMI is commenced. Then, after the change of the control rod pattern, the power of the nuclear reactor is gradually increased to the preset level. During this step, in order to minimize the rate of change in the thermal load on the fuel rods during the increase of the power, the power is increased at an extemely small rate by increasing the flow rate of the cooling water. The above described manner of operation is extremely complicated and troublesome.

The specification of U.S. Pat. No. 3,799,839 and Japanese Patent Publication No. 12793/1976 disclose an example of a reactor core structure in which the concentration of gadolinea is varied in the axial and radial directions of the core. Although this arrangement considerably flattens the axial and radial power distribution in the core, the operation of this core still requires the aforementioned change of the control rod pattern, causing various inconveniences as stated before in connection with the power control by control rods.

SUMMARY OF THE INVENTION

It is therefore an object of the invention to simplify the operation of the nuclear reactor.

It is another object of the invention to improve the availability factor of operation of the nuclear reactor.

It is still another object of the invention to facilitate the refueling activities in the nuclear reactor.

To these ends, according to the invention, a fuel assembly is composed of a plurality of first fuel rods each of which includes a fissile material and a burnable poison and a plurality of second fuel rods each of which contains a fissile material but no burnable poison. The core of the reactor is loaded with such a fuel assembly that the amount of the fissile material is larger at the upper part of the core than at the lower part of the core. At the same time, the number of the first fuel rods and the concentration of the burnable poison in the same are made substantially proportional to the power density at the positions where the fuel assembly is loaded in the reactor core. Preferably first fuel assemblies each of which includes both of the first and second fuel rods and second fuel assemblies each of which includes only the second fuel rods are placed in the core, such that the ratio of the number of the first fuel assemblies to that of the second fuel assemblies is 1:3.

BRIEF DESCRIPTION OF THE DRAWINGS

FIGS. 15A to 15D show heightwise distributions of various factors of the conventional reactor core in which: FIGS. 16A to 16D show heightwise distributions of various factors in a reactor core in which only burnable poison rule is adopted in which: FIG. 16B shows the poison rod distribution, FIGS. 17A to 17D show the heightwise distributions of various factors in the reactor core in which only the enrichment rule is adopted in which: FIGS. 18A to 18D show the heightwise distribution of various factors in the reactor core embodying the invention in which both of the burnable poison rule and the enrichment rule are adopted wherein: FIG. 18B shows the poison rod distribution.

DESCRIPTION OF THE PREFERRED EMBODIMENTS

Figure 1:
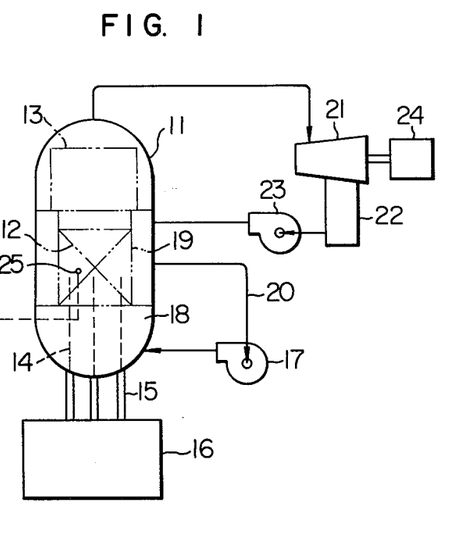
FIG. 1 is a schematic system diagram of a boiling water reactor power generating plant.

FIG. 1 schematically shows a boiling water reactor to which the present invention is applied. The reactor has a core 12 disposed in a reactor pressure vessel 11. Within the reactor pressure vessel 11, also disposed are a steam separator and a dryer 13 above the core 12. A plurality of control rods 14 are connected to a control rod drive device 15 by means of which the control rods are inserted into and withdrawn from the core 12 so as to control the power of the reactor. The control rod drive device is connected to a rod control system 16 adapted to control the control rod drive device 15 in the above described manner. The reactor pressure vessel 11 is filled with a coolant up to a level above the core 12. The coolant is adapted to be circulated by means of a circulation pump 17 through the lower plenum 18 below the core 12 into the space in a core shroud 19 surrounding the core 12. The circulation pump 17 is disposed in a recirculation piping system 20. The coolant removes heat from the nuclear fuel element, as it flows through the core so as to be converted to steam. The steam is supplied to a turbine 21 through the separator and dryer 13, and after expanding through the turbine 21, is collected and condensed by a condenser 22. The condensate is recirculated to the reactor pressure vessel 11 by means of a feed water pump 23. The turbine 21 is adapted to drive an alternator 24 connected thereto.

An in-core nuclear detector 25 is disposed in the core 12 so as to detect the power of the reactor.

Figure 2:
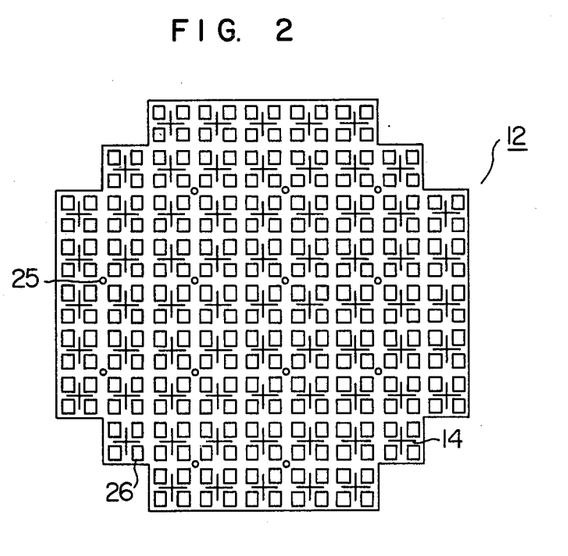
FIG. 2 is a schematic horizontal sectional view of the boiling water reactor as shown in FIG. 1.
Figure 3:
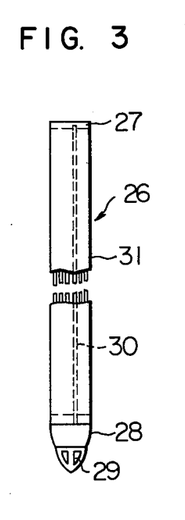
FIG. 3 is a side elevational view of a fuel assembly adapted to be loaded to the core of the boiling water reactor.

FIG. 2 shows the plan view of the boiling water reactor 12. A number of fuel assemblies 26 each of which has a structure as shown in FIG. 3 are disposed in the core 12. A cruciform shaped control rod 14 and the incore nuclear detector 25 are disposed between the adjacent fuel assemblies 26. Each of the fuel assemblies consists of an upper tie plate 27, a lower tie plate 28 having an opening 29, a plurality of fuel rods 30 fixed at their upper and lower ends to the upper and lower tie plates 27, 28, and a channel box 31. The channel box 31 is secured to the upper tie plate 27. All of the fuel rods 30 are disposed in the channel box 31. The coolant is received through the opening 29 into the fuel assembly 26.

Figure 4:
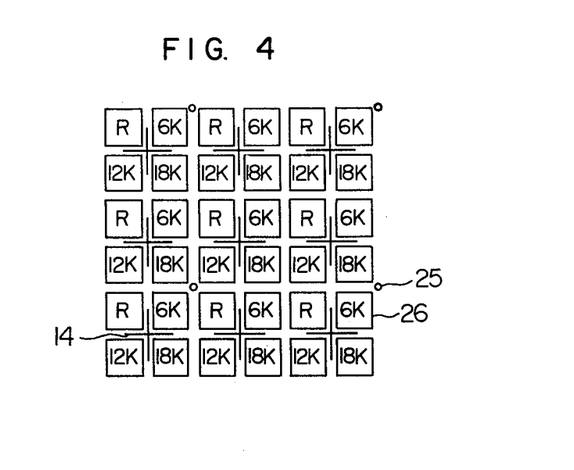
FIG. 4 is a partial enlarged view of the reactor core as shown in FIG. 2.

FIG. 4 shows in a larger scale a portion of the plan view of the core as shown in FIG. 2. In FIG. 4, symbols R, 6K, 12K and 18K represent, as will be detailed later, fuel assemblies 26 which have perspectively different ages, i.e. the fuel assemblies which have been placed in the core in consideration with their different elapsed times.

Conventionally, the control rods 14 have been used for two purposes of (1) compensation for the decrease of the reactivity and (2) adjustment of the power distribution. Therefore, an alternative measure has to be taken if the control rods are to be kept unmoved. One of the alternative measure to be taken is to change the flow rate of the coolant flowing through the reactor core 12. This measure however is almost ineffective to the control of the power distribution. In order to achieve the above stated objects, it is necessary to design the reactor core such that both of the reactivity and the power distributions are kept constant over one year.

In an approximation in which the power distribution is regarded as being equivalent to the neutron flux distribution, there is a relationship as given by the following equation (1), between the power distribution and the nuclear characteristic (infinite multiplication factor) K.

$$M^2 \cdot \Delta\phi + (K-1)\phi = 0 \quad (1)$$

The symbol $M^2$ represents the distance of movement of neutron which is directly determined by the void and other factors and indirectly by the power distribution $\phi$. Namely, the infinite multiplication factor K for obtaining the power $\phi$ is given by the following equation (2).

$$K = 1 - \frac{M^2 \cdot \Delta\phi}{\phi} \quad (2)$$

Therefore, the necessary and sufficient condition for obtaining the power distribution $\phi$ which is kept constant over a certain time length is to realize an infinite multiplication factor distribution which is fixed in relation to the time. In other words, neither the power distribution nor the reactivity changes if an infinite multiplication factor which does not change over a certain time length is realized.

In order to realize an infinite multiplication factor which is not changed even by an increase of the exposure, it is preferred to keep always constant the mean infinite multiplication factor of four fuel assemblies constituting one cell. The term "cell" is used here to mean a section constituted by four fuel assemblies 26 (R, 6K, 12K and 18K) surrounding a common control rod 14, as shown in FIG. 4. It is a typical way of fuel replacement to renew periodically one fuel assembly of each cell once a year. Thus, the renewal of the fuel is executed once a year, and ¼ of all fuel rods are renewed at each time of renewal. In other words, each fuel assembly 26 is allowed to stay in the core for four years.

Figure 5:
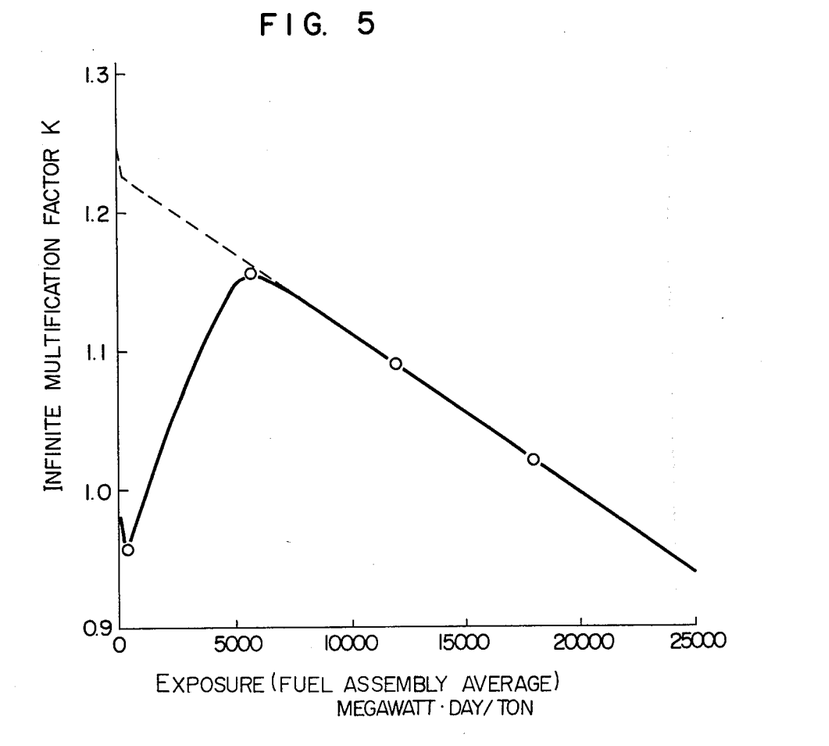
FIG. 5 is a characteristic diagram showing the change of infinite multiplication factor of a gadolinea-bearing fuel assembly due to the increase of exposure.

The influence of the exposure upon the mean infinite multiplication factor K of the fuel assembly can be eliminated by the use of a burnable poison, typically gadolinea. The infinite multiplication factor K of the fuel assembly 26 containing gadolinea varies along the full-line curve in FIG. 5, as the exposure increases. The broken-line curve in FIG. 5 shows the change of the infinite multiplication factor K of a fuel assembly containing no gadolinea. The exposure of the fuel assembly 26 is as high as about 24000 megawatt·day/ton per four year. Therefore, the cell is loaded with a new fuel assembly for each 6000 megawatt·day/ton increment of the exposure. As stated before, the reactor core 12 has four sorts of fuel assemblies R, 6K, 12K and 18K respectively having different ages, i.e. different times of stay in the core. More specifically, R represents the new fuel assemblies which has been just loaded and the exposure of which is zero. Fuel assemblies of exposure of 6000 megawatt·day/ton, 12000 megawatt·day/ton and 18000 megawatt·day/ton are represented by 6K, 12K and 18K, respectively.

Since the gadolinea is completely burnt up in the first one year as shown in FIG. 5, the increase of the infinite multiplication factor K in the fuel assembly R is remarkable during this period. The infinite multiplication factors K of the fuel assemblies 6K, 12K and 18K, which have stayed in the reactor core for one to four years decreases as the exposure increases. Namely, the rate of increasing the infinite multiplication factor k of the fuel assembly R is about three times as large as the rate of decreasing the indefinite multiplication factor K of the fuel assemblies 6K, 12K and 18K.

Figure 6:
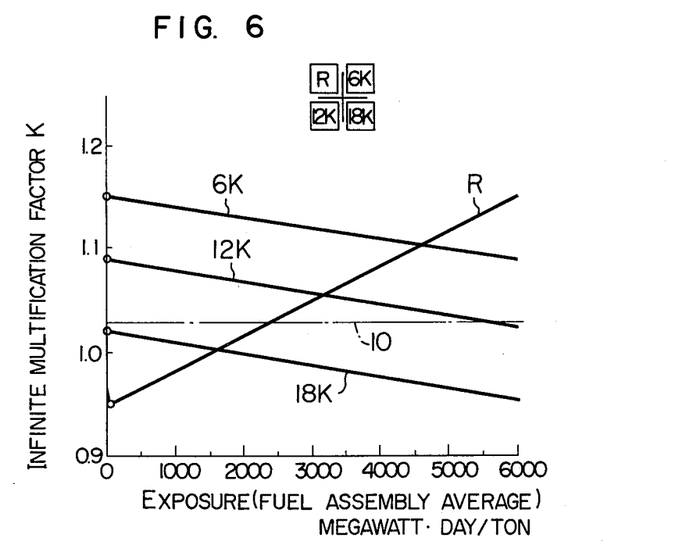
FIG. 6 is a characteristic diagram showing the changes of infinite multiplication factors of respective fuel assemblies having different histories, attributable to the increase of the exposure.

Thus, by disposing the four sorts of fuel assemblies R, 6K, 12K and 18K uniformly in the reactor core 12 as shown in FIG. 4, the mean infinite multiplication factor of these four fuel assemblies is made constant as represented by a straight line 10 in FIG. 6, irrespective of the time, i.e. independent of the increase of the exposure. In FIG. 6, straight lines R, 6K, 12K and 18K represent the change of infinite multiplication factor of respective fuel assemblies R, 6K, 12K and 18K. It is thus possible to obtain a constant mean infinite multiplication factor over the entire region of the core 12.

Hereinafter, an explanation will be made as to the burning characteristics of the burnable poison. As stated before, each fuel assembly 26 is constituted by disposing a plurality of fuel rods in a channel box 12. Some of the fuel rods include fuel pellets bearing gadolinea, which is a burnable poison together with the nuclear fuel material. These fuel rods containing the gadolinea will be referred to as "poison rod", hereinafter. Other fuel rods have fuel pellets which contain fissile material but no gadolinea.

(a) Reactivity of Poison Rod

Each poison rod is a perfect absorbent and has a neutron absorbing region of a definite radius r. The number of neutrons absorbed by the poison rod per second and per length of the poison rod is given by the following equation.

$$2\pi r(\phi/4)(\text{neutron/cm·s})$$

On the other hand, the number of neutrons absorbed by the whole fuel assembly 26 is given as follows $$\Sigma a \cdot \phi \cdot Sa(\text{neutron/cm·s})$$

In the above equation, $\Sigma a$ and $Sa$ represent, respectively, a neutron absorbing cross-sectional area and neutron absorbing surface area, respectively.

Then, the poison reactivity Kp is given as the ratios of above areas by the following equation (3):

$$Kp = \frac{\pi n r}{2 \Sigma a \cdot Sa} = C_1 n r \quad (3)$$

where, n and Cl are number of poison rods in each fuel assembly 26 and a constant. The reactivity of the poison rods is in proportion to its radius and the number thereof. The time-dependency of the radius of the poison rod will be described later.

(b) Physical Property of Poison Rod

Physical constants of gadolinium (Gd) constituting the gadolinea are shown in Table 1 below.

TABLE 1

| nuclides | abundance of existence | thermal neutron absorption cross-sectional area ($10^{-24}$ cm$^2$) |
| --- | --- | --- |
| Gd 155 | 14.73 | 61,000 |
| Gd 157 | 15.68 | 240,000 |

The gadolinium has an extremely large neutron absorbing cross-sectional area. The mean free path of thermal neutron in a poison rod containing 1% by weight of the gadolinium is about 0.62 mm. The concentration of gadolinea in the poison rod is usually larger than 1% by weight. Since the diameter of the poison rod is about several millimeters, it may be estimated that the substantial absorption of the neutron is made by the surface of the poison rod. The nuclide of gadolinium having absorbed the neutron actually loses the power for absorbing the neutron. Consequently, the region in the poison rod capable of absorbing the neutron moves from the surface to the central portion as the time elapses so that the region becomes less and less. The change of the radius r of the neutron absorbing region is given by the following equation (4)

$$-\frac{d}{dt}(\pi r^2 N) = 2\pi r\phi/4 \qquad (4)$$

where, N represents the number of gadolinea per volume of the poison rod (pieces/cm$^3$). Thus, the following equation (5) is derived.

$$\dot{r} = -\frac{\phi}{4N}, r = r_o - \frac{\phi t}{4N} \qquad (5)$$

where, $r_o$ is the radius of the neutron absorbing region in the poison rod of the new fuel assembly 26 placed in the nuclear reactor core, while $\dot{r}$ and t represent, respectively, the rate of reduction of the above-mentioned radius and the time. The following equation (6) is derived by substituting the above equation (5) for the equation (3).

$$Kp = C_1 n \left( r_o - \frac{\phi \cdot t}{4N} \right) \qquad (6)$$

(c) Requirement for Keeping Properties of Cell (four fuel assemblies) Constant (i) Requirement for Complete Burning-up of Gadolinea The following equation is satisfied when the gadolinea is burnt down completely by the time defined by T=one year x rate of utilization.

$$N = \frac{t}{4 r_o} \phi = C_2 \phi \qquad (7)$$

where, $C_2$ is a constant.

(ii) Requirement for Compensation for Deterioration of Infinite Multiplication Factor The rate of depletion of the fuel rod containing no gadolinea is given by the following equation (8)

$$\frac{d}{dt} K = -\alpha\phi \qquad (8)$$

The mean depletion rate of the infinite multiplication factor over the entire cell is given by the same equation. In order that the depletion of the infinite multiplication factors of four fuel assemblies in one cell is compensated by the poison (gadolinea) of one fuel assembly 26, the rate of decrease of the poison reactivity of the fuel assembly is 4 times as large as given by the equation (8) above. This condition can be obtained as follows, from the equation (6), $$\frac{C_1 n}{4N} \phi = 4\alpha\phi \text{ or } \frac{n}{N} = \frac{16\alpha}{C_1} = C_2$$

The following equation (9) is obtained by substituting the equation (7) into the above equations $$n = C_1 C_2 \phi \equiv C_4 \phi \qquad (9)$$

where $C_4$ is a constant.

The nuclear characteristics of the cell can remain unchanged over one year, so that the desired performance is achieved, if the above equations (7) and (9) are simultaneously satisfied.

(d) Burning Characteristics of Fuel Assemblies Containing Gadolinea

Figure 7:
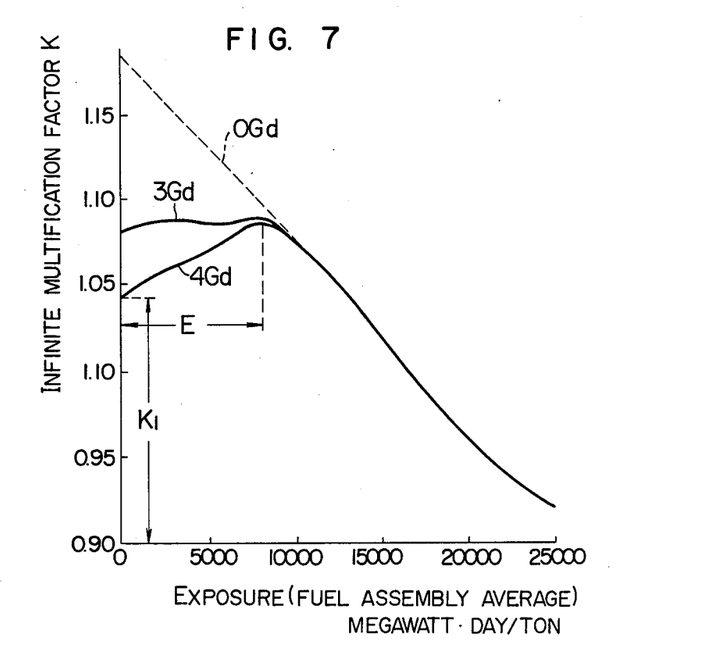
FIG. 7 is a chart showing the relationship between the exposure and the infinite multiplication factor, with a parameter of the number of poison rods.
Figure 8:
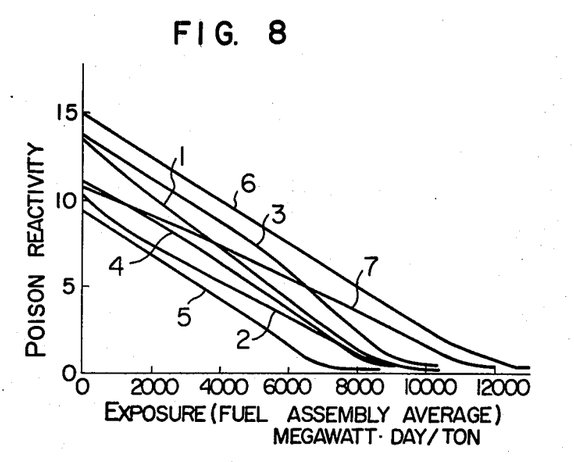
FIG. 8 is a chart showing the relationship between the exposure and the poison reactivities of fuel assemblies having different number of poison rods and gadolinea concentrations.

The validity of the simple approximation of the change of reactivity in relation to time as shown in FIG. 6 will be evaluated hereinunder. The change of the infinite multiplication factor K due to the change of exposure is shown in FIG. 7. In FIG. 7, the broken line OGD shows the change of infinite multiplication factor in the fuel assembly including no poison rod. Similarly, characteristics of the fuel assemblies including 3 (three) and 4 (four) poison rods are shown by curves 3Gd and 4Gd. The effect of the gadolinea is obtained by the method of perturbation, and can be illustrated as shown in FIG. 8. The curves in FIG. 8 show the characteristics of the fuel assemblies as shown in Table 2 below.

TABLE 2

| No. | Gd. concentration (% by weight) | | | |
|---|---|---|---|---|
| | 4% | 5% | 6% | 7% |
| 1 | 4 | — | — | — |
| 2 | 3 | — | — | — |
| 3 | — | 4 | — | — |
| 4 | 1 | 2 | — | — |
| 5 | — | 2 | — | — |
| 6 | — | — | 2 | 2 |
| 7 | — | — | 3 | — |

Figure 9:
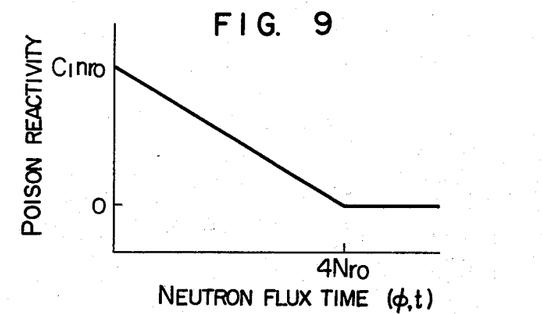
FIG. 9 is a chart showing the relationship between the poison reactivity and the neutron flux time.

For instance, the curve 1 in FIG. 8 shows the characteristic of a fuel assembly including four poison rods containing 4% by weight of gadolinea. The characteristics as shown in FIG. 8 can be approximated by a triangle as shown in FIG. 9.

Figure 10:
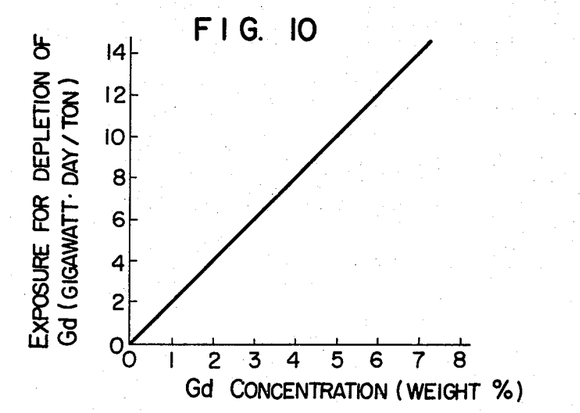
FIG. 10 is a chart showing the relationship between the concentration of gadolinea and the exposure for depletion of gadolinea.
Figure 11:
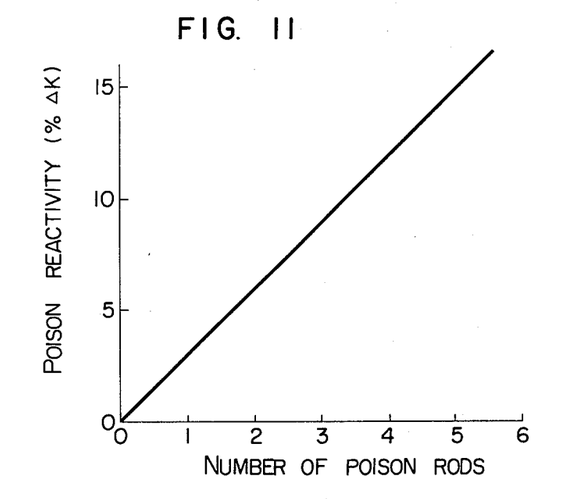
FIG. 11 is a chart showing the relationship between the number of poison rods and the reactivity of poison.

Characteristics as shown in FIG. 10 and FIG. 11 can be derived from the characteristic as shown in FIG. 8. As will be seen in these Figures, the exposure at which the gadolinea is extinguished is in direct proportion to the concentration of gadolinea, while the reactivity of poison is in proportion to the number of the poison rods. More specifically, referring to FIG. 7, the infinite multiplication factor $K_1$ of the fuel assembly 26 at a exposure of 0 megawatt·day/ton is determined by the number of the poison rods included by the fuel assembly 26. At the same time, the exposure E at which the gadolinea contained in the poison rods of the fuel assembly 26 is depleted is determined by the concentration of gadolinea. It is therefore possible to obtain a fuel assembly having a rate of increase of infinite multiplication factor, in the region of exposure up to 6000 megawatt·day/ton, as about three times as large as the rate of decrease of the infinite multiplication factor at the region of the exposure above 6000 megawatt·day/ton, by suitably selecting the number of the poison rod included by the fuel assembly 26 and the concentrate of gadolinea.

Consequently, by arranging four fuel assemblies at the reactor core such that the degrees of these fuel assemblies are changed by each 6000 megawatt-day/ton as shown in FIG. 4, the mean infinite multiplication factor of the cell can be maintained constant irrespective of the exposure, as will be seen from the characteristic 10 of FIG. 6.

When the boiling water reactor is put into operation for the first time after the building thereof, it is preferred to load the reactor core 12 with fuel assemblies having the characteristics of the foregoing fuel assemblies R, 6K, 12K and 18K.

The method of maintaining a constant power distribution making use of a burnable poison has thus been established.

The power distribution which is maintained constant is represented, as stated before, by the diffusion equation (1)

$$M^2 \cdot \Delta \phi + (K-1)\phi = 0 \qquad (1)$$

The value of K in the above equation (1) is given as follows.

$$K = K_o - K_{exp} - K_p - K_{doppler} - K_{xe} - K_{void} \qquad (10)$$

where, $K_o$: The value of K in the cold state at the starting of the operation cycle, i.e. when the exposure is 0 megawatt·day/ton. K is the infinite multiplication factor peculiar to the fuel assembly free from gadolinea and can be varied by changing the enrichment of the fissile material.

$K_{exp}$: Infinite multiplication factor due to depletion by burning.

$K_p$: Poison reactivity due to depletion by burning.

$K_{doppler}$: Infinite multiplication factor by the temperature of the fuel.

$K_{xe}$: Infinite multiplication factor due to loss by voids.

Since the value of ($K_{exp} + K_p$) can be maintained constant as stated before, it can be represented by (a, $\phi$T) from t=T.

Thus, the relationships between the reactivities and the power can be expressed as follows.

$$K_{exp} + K_p = a_1 \phi T \qquad (11)$$

$$K_{doppler} = a_2 \phi \qquad (12)$$

$$K_{xe} = a_3 \phi / (a_4 + \phi) \qquad (13)$$

$$K_{void} = F(\int \phi dz) \qquad (14)$$

In the equation (14) above, z denotes the axial height of the reactor core 12. It will be seen that the $K_o$ is determined if the $\phi$ is given and the $\phi$ can be determined if the $K_o$ is given. The latter way of solution is referred to as Haling's solution, and can be expressed by the following equation (15).

$$K_o = 1 + K_{exp} + K_p + K_{doppler} + K_{xe} - \frac{M^2 \cdot \Delta \phi}{\phi} + K_{void} \qquad (15)$$

Figure 12:
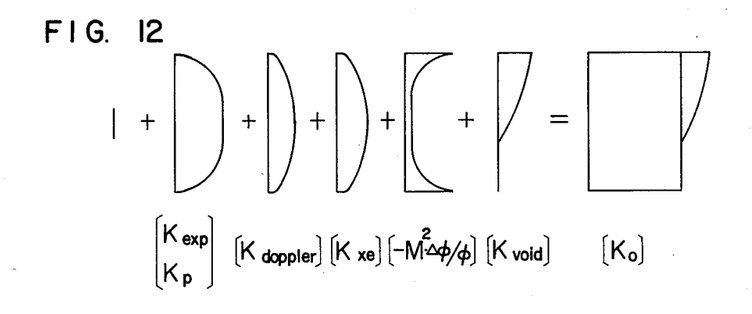
FIG. 12 is an illustration of axial or heightwise distribution of infinite multiplication factor attributable to various reasons.
Figure 13:
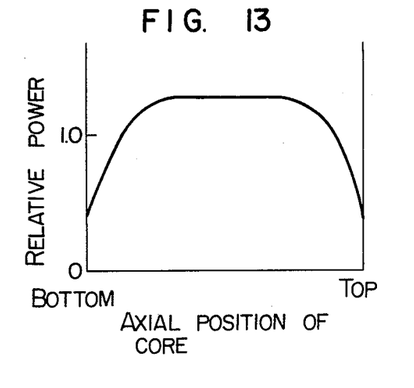
FIG. 13 is a chart showing a power distribution in the core in accordance with the invention.
Figure 14:
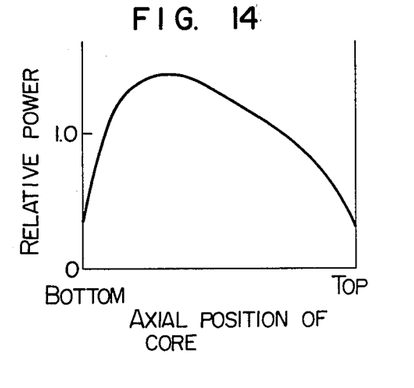
FIG. 14 is a chart showing a power distribution in the conventional core.
Figure 15A:
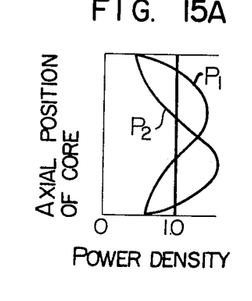
FIG. 15A shows the power density distribution.
Figure 15B:
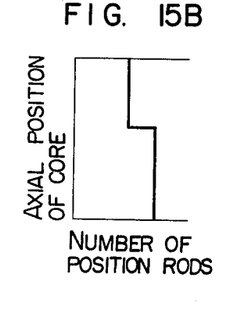
FIG. 15B shows the poison rod distribution.
Figure 15C:
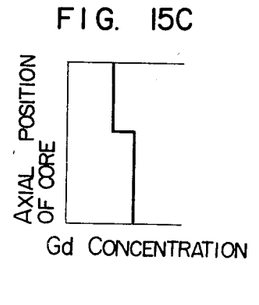
FIG. 15C shows the gadolinea concentration distribution and FIG. 15D shows enrichment distribution of fissionable material.
Figure 15D:
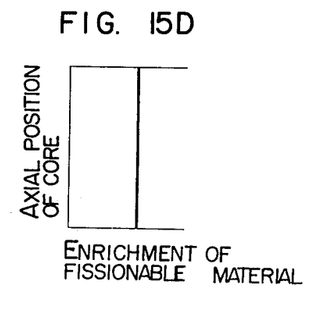
Figure 16A:
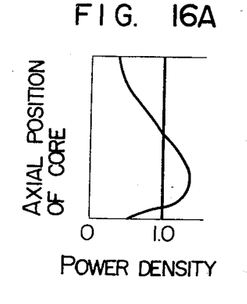
FIG. 16A shows the power density distribution.
Figure 16B:
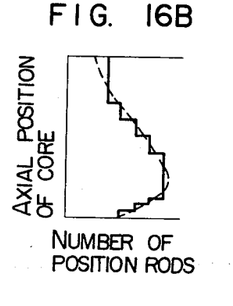
Figure 16C:
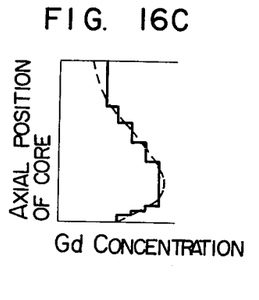
FIG. 16C shows the gadolinea concentration distribution and FIG. 16D shows enrichment distribution of fissionable material.
Figure 16D:
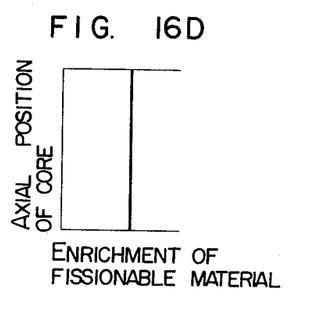

The distribution of the multiplication factor of each K term in the above equation in the heightwise direction of the reactor core is as shown in FIG. 12. In order to realize a vertical symmetry of $\phi$ as the power distribution, it is necessary to compensate for the asymmetry due to the presence of voids, by adding a reactivity to the asymmetrical portion. By increasing the value of $K_o$ at the upper part of the reactor core by an amount corresponding to loss of the reactivity due to voids, a symmetrical heightwise power distribution of a good pattern as shown in FIG. 13 can be obtained by burning and Doppler's and Zenon's feedback effect. If an equal value of $K_o$ is given to both of the upper and lower parts of the reactor core, the power distribution becomes to have a pattern as shown in FIG. 14, which is known as Hailing distribution.

It is possible to reduce the peaking coefficient of the heightwise power distribution by 10% or so (relative value), by giving a stepped variation in enrichment of the fissile material. This means that the power density can be improved by 10% and the soundness of fuel is improved corresponding to a reduction of load on the fuel by 10%.

Gadolinium, hafnium, europium and their compounds can be used as the burnable poison, instead of the described gadolinea.

Three basic rules of distributions of the burnable poison and enrichment, which are the essential requisite for realizing a structure of core of boiling water reactor capable of being operated over one year, without the insertion of control rods 14, are given as follow.

(1) In order to cope with the requirement of perfect compensation for the depletion of the reactivity, the number of poison rods must be in proportion to the power distribution.

(2) In order that the burnable poison may be completely burnt, the concentration of the burnable poison has to be in proportion to the power distribution.

(3) In order to attain a flattened power distribution, i.e. a vertical symmetry of the power distribution, it is necessary to make the enrichment of the fissile material in the upper part of the core higher than in the lower part of the same so that the change in reactivity due to the presence of voids may be compensated.

In consideration of the above requirements, it is understood that each requirement can be attained solely by its peculiar manipulated variable. In other words, it is impossible to simultaneously satisfy two or more of the above three requirements by means of one manipulated variable. Particularly, it is to be pointed out that the adjustment of the burnable poison is ineffective in improving the power distribution, although it may be effective in achieving the constant reactivity and the constant power distribution. There have been made many proposals and attempts to improve the power distribution by means of the burnable poison. However, it is quite unreasonable to expect the burnable poison to serve the role of maintaining a good power distribution over one year as far as the burnable poison is exhausted at the end of the operation cycle, i.e. at the exposure of 6000 megawatt·day/ton.

FIGS. 15A to 15D, FIGS. 16A to 16D, FIGS. 17A to 17D and FIGS. 18A to 18D show, the power distributions, numbers of poison rods, gadolinea concentrations and heightwise enrichment distributions of fissile material, in a conventional reactor core structure (I), in a core structure (II) in which the aforementioned two rules or requirements concerning the burnable poison are adopted, in a core structure (III) in which the aforementioned rule concerning the enrichment is adopted and in a core structure (IV) in which all of the three rules are adopted, respectively. More plainly, FIGS. 15A to 15D, FIGS. 16A to 16D, FIGS. 17A to 17D and FIGS. 18A and 18D correspond, respectively, to the cores I, II, III and IV, respectively.

Figure 17A:
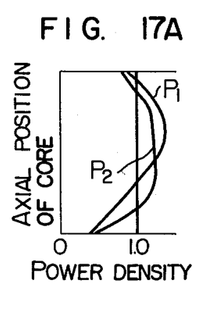
FIG. 17A shows the power density distribution.
Figure 17B:
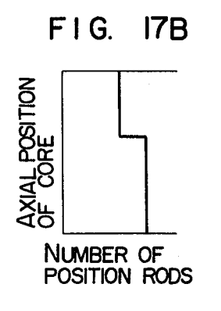
FIG. 17B shows the poison rod distribution.
Figure 17C:
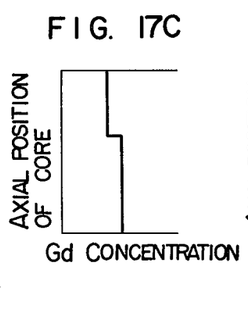
FIG. 17C shows the gadolinea concentration distribution and FIG. 17D shows the enrichment distribution of fissionable material.
Figures 17D, 18D, 19:
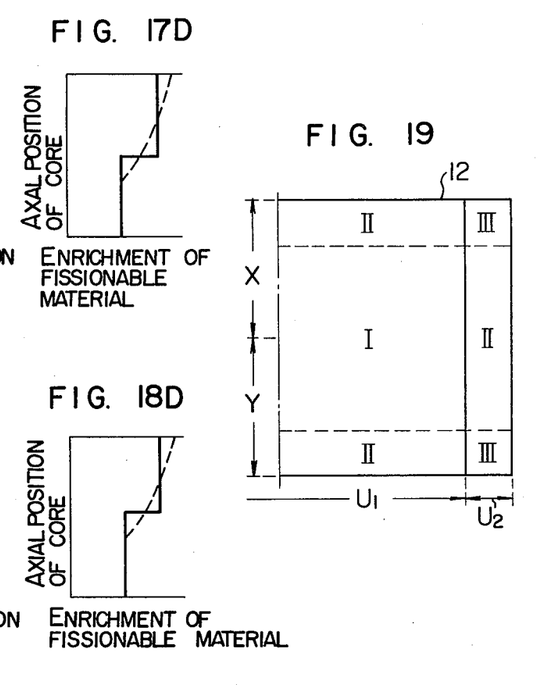
FIG. 18C shows a gadolinea concentration distribution and FIG. 18D shows the enrichment distribution of the fissionable material.
FIG. 19 is a schematic illustration of a reactor core which is a practical embodiment of the invention.
Figure 18A:
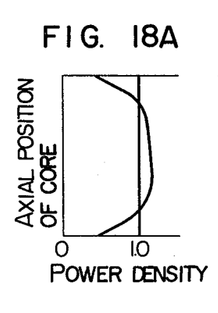
FIG. 18A shows the power density distribution.
Figure 18B:
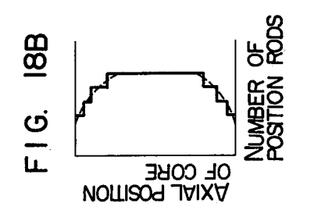
Figure 18C:
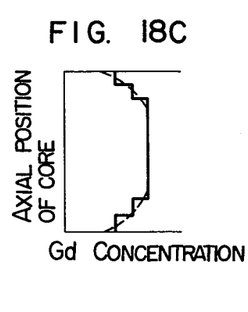

In case of the core structure I to III as shown in FIGS. 15A–15D to 17A–17D, the power distribution is changed from P1 to P2 between the beginning and end of each operation cycle. The broken lines in FIGS. 16B, 16C and 18B, 18C represent the distribution of the power density. The number of poison rods and the gadolinea concentrations exist substantially in proportion to the power density, although they are varied in a stepped manner corresponding to the power density. The broken lines in FIG. 17D and 18D represent the distribution of void reactivity.

Various problems involved by the structures of respective cores I to IV are summarized in Table 3 below.

TABLE 3

| core structure | adoption of rules concerning burnable poison | adoption of rules concerning enrichment | problems |
|---|---|---|---|
| (I) | not adopted | not adopted | 1. reactivity and power distribution changed (extraction of control rods necessary) 2. power peaking |
| (II) | adopted | not adopted | 1. power peaking large |
| (III) | not adopted | adopted | 1. reactivity and power distribution changed (extraction of control rods necessary) |
| (IV) | adopted | adopted | — |

It will be seen from Table 3 above that the core structure (IV) affords constant reactivity and power distribution, as well as a good distribution of power.

Patent applications have been made already concerning a technic to distribute the burnable poison in proportion to the power distribution (Specification of U.S. Pat. No. 3,799,839 and Japanese Patent Publication No. 12793/76) and to differentiate the enrichment of the fissile material at the upper and lower parts of the reactor core (Specifications of U.S. Pat. Nos. 835962 and 835964). Each of these technics is to adopt one of the rule out of three rules as required by our invention. The reactor core structure which can obviate the operation of the control rods can be realized only when all of these three rules are fully met simultaneously, and it is almost impossible to enjoy the advantage offered by the rule concerning the enrichment, i.e. a good power distribution obtainable without relying upon the control rods.

The "reactor core structure which does not necessitate the operation of control rods during operation" which can never be attained by independent and separate adoption of the three rules can be achieved only when all of these three rules are adopted simultaneously.

FIG. 19 shows a practical embodiment of the invention. More specifically, FIG. 9 is a schematic illustration of right-hand side half of a boiling water reactor core 12 embodying the present invention. The core 12 is divided into regions I, II and III as illustrated. Regions II and III are disposed so as to surround the central region I. The nuclear characteristics of these regions are shown in the following Table 4.

TABLE 4

| regions | power ratio | degree of burn up for year (megawatt . day/ton) | number of poison rods | Gd. concentration (% by weight) |
|---|---|---|---|---|
| I | 4 | 6,000 | 8 | 3.00 |
| II | 3 | 4,500 | 6 | 2.25 |
| III | 2 | 3,000 | 4 | 1.50 |

The reactor core 12 is at the same time divided into an upper region X and a lower region Y. The mean enrichment (% by weight) of the uranium 235 as the fissile material is about 2.2. and about 2.0, in the upper and lower regions X and Y, respectively.

Since the exposure at which the gadolinea is depleted are 6000, 4500 and 3500 megawatt-day/ton in the regions I, II and III, respectively, the concentration of gadolinea in the poison rods of respective regions are 3.00, 2.25 and 1.50% by weight, respectively.

Figure 20:
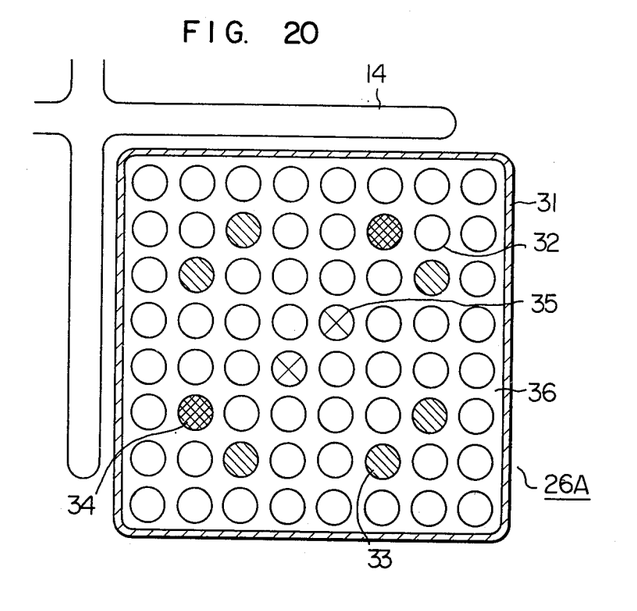
FIG. 20 is a cross-sectional view of fuel assembly placed in a region U1 of FIG. 19.

Hereinafter, a description will be made as to two sorts of fuel assemblies constituting the reactor core, with specific reference to FIGS. 20 and 21. The fuel assembly 26A as shown in FIG. 20 has a number of fuel rods 32, 33 and 34, as well as a water rod 35, disposed in a channel box 31. Passages 36 of cooling water are formed between adjacent fuel rods within the channel box 31. The fuel assembly 26A is placed in the central region U1 of the reactor core 12 as the aforementioned fuel assembly R. The compositions of the fuel rods 32, 33 and 34 are shown in Table 5 below.

TABLE 5

| fuel rod No. | 32 | 33 | 34 |
|---|---|---|---|
| Uranium enrichment in rods 32, 33 and 34, enrichment is 2.2% by weight at upper region | *0 | *3.00 | *3.00 |
| in rods 32, 33 and 34, enrichment is 2.0% at lower region | | *2.25 | *0 |
| number of fuel rods per assembly | 54 | 6 | 2 |

*mark shows Gd concentration (% by weight)

The upper part of each of fuel rods 32–34 contain uranium 235 of an enrichment of 2.2% by weight, while the lower part contains uranium 235 whose enrichment is 2.0% by weight. The fuel rods 32 does not contain gadolinea, while fuel rods 33 and 34 contain gadolinea. In the fuel rod 33, the concentration of gadolinea is 2.25% by weight in the upper and lower portions each of which extends over 1/6 of whole rod length from respective ends, and 3.00% by weight in the remainder middle portion of the rod. In case of the fuel rod 34, the end portions extending over 1/6 of the whole rod length from respective ends do not contain the gadolinea at all, while the remainder middle portion includes 3.00% by weight of gadolinea.

By loading the cell in the region U1 with a new fuel assembly 26A at each time of the annual fuel renewal, it is possible to keep 8 poison rods and 6 poison rods in the cells of the region I and in the cells of region II of the region U1, respectively.

Figure 21:
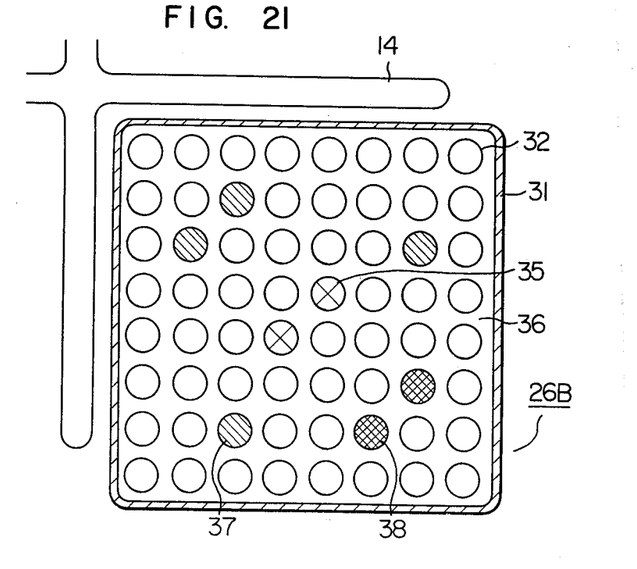
FIG. 21 is a cross-sectional view of fuel assembly placed in a region U2 of FIG. 19.

FIG. 21 shows another sort of fuel assembly 26B. This fuel assembly consists of a number of fuel rods 32, 37 and 38, as well as a water rod 35, disposed in a channel box 31. This fuel assembly 26B is adapted to be placed in the region $U_2$ surrounding the central region $U_1$, as the aforementioned fuel assembly R. The compositions of the fuel rods 37 and 38 are shown in Table 6 below.

TABLE 6

| fuel rod No. | 37 | 38 |
|---|---|---|
| uranium enrichment | | |
| 2.2% by weight at upper region in both rods 37, 38 | *1.50 | *0 |
| | *2.25 | *2.25 |
| 2.0% by weight at lower region in both rods 37, 38 | *1.50 | *0 |
| number of rods per assembly | 4 | 2 |

*mark shows Gd concentration (% by weight)

Each fuel assembly 26B includes 56 fuel rods 32. The upper and lower parts of each of fuel rods 37 and 38 contain uranium 235 of enrichments of 2.2% and 2.0% by weight. The fuel rod 37 contains in its both end portions extending over 1/6 of whole rod length from respective ends, 1.50% by weight of gadolinea. The remainder middle portion of the fuel rod 37 contains 2.25% by weight of gadolinea. In case of the fuel rod 38, no gadolinea is contained by both axial end portions extending over 1/6 of whole rod length from respective ends, but the remainder middle portion contains 2.25% by weight of gadolinea.

By loading the cell in the region $U_2$ with a new fuel assembly 26B at each time of the annual fuel renewal, it is possible to keep 4 poison rods and 6 poison rods, respectively, in the cell of the region III and in the cell of the region II of the region $U_2$.

In order to compensate for the mean depletion of the reactivity in each of the regions I, II and III, the poison reactivities are selected to be 24%, 18% and 12%, in respective regions. Since the poison reactivity shared by each poison rod is 3%, the numbers of the poison rods required in the regions I, II and III are 8, 6 and 4, respectively.

Figure 22:
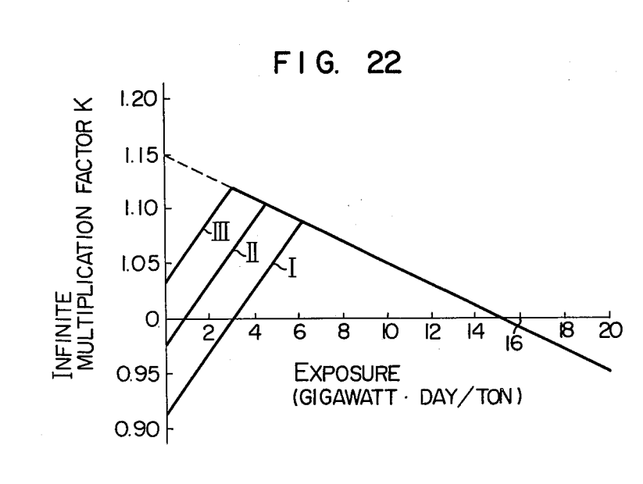
FIG. 22 is a chart showing the relationship between the exposure and the infinite multiplication factor in each of regions I, II and III of FIG. 19.
Figure 23:
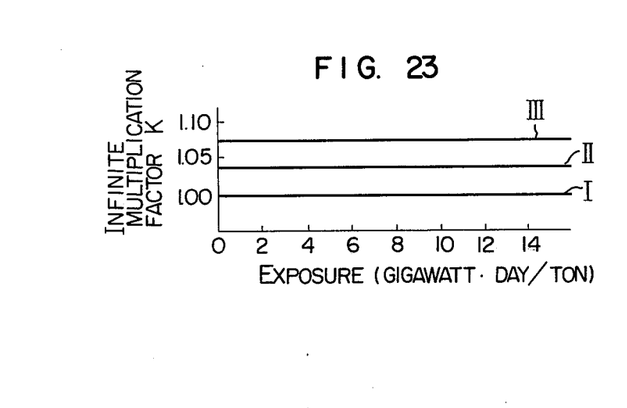
FIG. 23 is a chart showing the relationships between the exposure and the infinite multiplication factor in each cell of regions I, II and III of FIG. 19.

FIG. 22 shows how the infinite multiplication factors K of the portions of fuel assemblies 26A and 26B residing in the regions I, II and III are changed. The characteristic curves denoted by I, II and III correspond, respectively, to the portions of the fuel assemblies 26A and 26B residing in the regions I, II and III. As will be seen from FIG. 23, the mean infinite multiplication factor in each cell in the regions I, II and III is kept constant, independent of the change in the exposure. More specifically, the mean infinite multiplication factor in the regions I, II and III are kept constant at 1.0000, 1.0375 and 1.0750, respectively.

Figure 24:
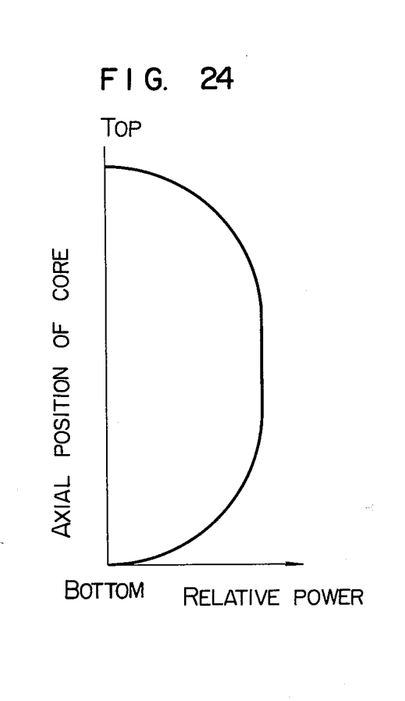
FIG. 24 shows the power distribution in the heightwise direction of the reactor core as shown in FIG. 18.

The power distribution in the heightwise direction of the reactor core 12 is as shown FIG. 24. The pattern of power distribution as shown in FIG. 24 remains substantially unchanged over the operation period of the nuclear reactor. It is therefore possible to keep a constant control rod density, as shown by the characteristic A in FIG. 25, over the whole period of the operation. This means that there is no need of change of the control rod pattern and that the operation of the nuclear reactor is simplified correspondingly. The elimination of necessity of changing of the control rod pattern also ensures an increased level of rate of operation of the nuclear reactor.

Figure 26:
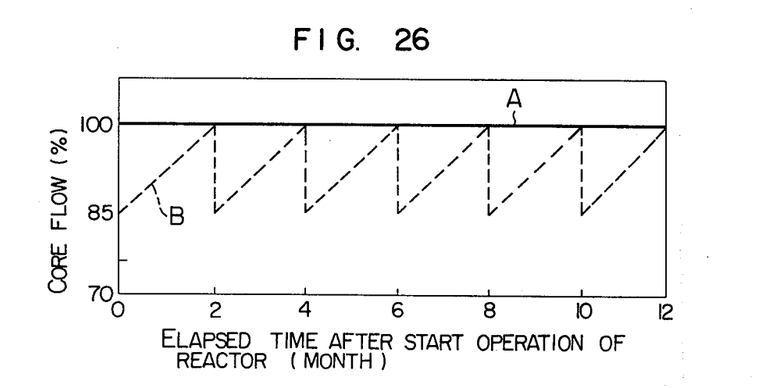
FIG. 26 is a chart showing the change in the flow rate of the cooling water through the reactor core in relation to the time elapsed.
Figure 27:
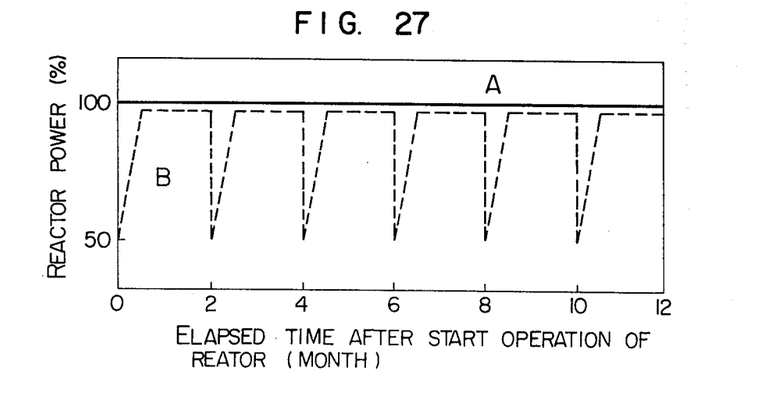
FIG. 27 is a chart showing the change in the reactor power in relation to the time elapsed.

In addition, as will be seen from characteristics A in FIGS. 26 and 27, the flow rate of the coolant through the reactor core and the power of the reactor can remain constant over the period of operation of the nuclear reactor. Since no reduction of the coolant flow rate is caused in the operation period, the lowering of the thermal margin attributable to the reduction of the coolant flow rate can be avoided.

Further, the necessity of the troublesome replacement of fuel assemblies referred to as "shuffling", which has been indispensable in the conventional reactor core, can be completely eliminated, because all what is required is to renew only one fuel assembly in each cell, at each time of the fuel renewal. Consequently, the method of fuel replacement is advantageously simplified, and the time required for the fuel replacement is remarkably shortened. These also lead to the improvement in the rate of operation of the nuclear reactor.

Figure 25:
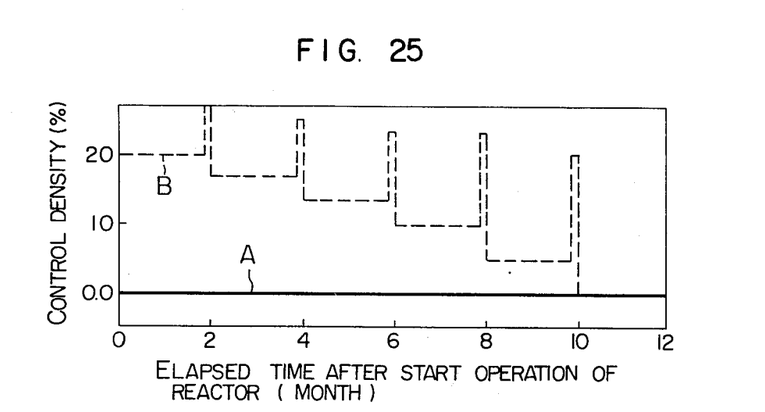
FIG. 25 is a chart showing the change in the density of control rods in relation to the time elapsed.

Characteristics B in FIGS. 25, 26 and 27 show, respectively, the control rod density, flow rate of coolant through the reactor core and the reactor power in accordance with the conventional method of operating a boiling water reactor.

Although the burnable poison has been described to be contained by fuel pellet together with the fuel, it is possible to use perfect poison rod full of the burnable poison, as will be clear from a consideration of the burning of the poison rod from the view point of nuclear physics. In such a case, although the proportional constant has to be changed, the aforementioned rule concerning the use of the burnable poison in relation to the power density distribution can be equally adopted.

As has been described, the present invention offers great advantages of simplified method of operation of the nuclear reactor.

We claim:

1. In a structure of a nuclear reactor core having axially upper and lower regions and radially central and peripheral regions and comprising predetermined fuel assemblies utilized with other fuel assemblies, each of said predetermined fuel assemblies including a plurality of first fuel rods each containing a fissile material and a burnable poison, and a plurality of second fuel rods each containing a fissile material without burnable poison, said first and second rods extending in the axial direction of said nuclear reactor core when said predetermined fuel assembly is loaded in said nuclear reactor core, the improvement comprising said predetermined fuel assembly having a plurality of said first fuel rods including one group of first fuel rods having respectively an upper part having an upper end portion and a lower part having a lower end portion, said upper and lower parts being separated at the axial middle thereof, said lower part being arranged to be within the axially lower region of said nuclear reactor core and packed with the fissile material of a uniform enrichment, and said upper part being arranged to be within the axially upper region of said nuclear reactor core and packed with the fissile material of a uniform enrichment more abundant than that packed in said lower part, and said one group of said first fuel rods containing the burnable poison having a concentration decreasing from the axial middle toward said upper and lower end portions, and the remaining first fuel rods of said predetermined fuel assembly having respectively and upper end portion, a lower end portion and a middle portion, said upper end portion being arranged to be within the axially upper region of said nuclear reactor core and packed with the fissile material without burnable poison, said lower end portion being arranged to be within the axially lower region of said nuclear reactor core and packed with the fissile material without burnable poison, and said middle portion being packed with the fissile material containing the burnable poison, a plurality of said predetermined fuel assemblies being distributed over said nuclear reactor core in such a way that the concentration of the burnable poison in said first fuel rods and the number of said first fuel rods decrease from said radially central region towards said peripheral region.

2. A structure of a nuclear reactor core as claimed in claim 1, wherein said fissile material is uranium-235.

3. A structure of a nuclear reactor core as claimed in claim 2, wherein said burnable poison is selected from the group consisting of gadolinium, hafnium, europium and compounds thereof.

4. A structure of a nuclear reactor core as claimed in claim 1, further comprising control rods each surrounded by a group of four fuel assemblies formed of a combination of said first and second fuel assemblies, said first fuel assembly comprising said first fuel rods and said second fuel rods, said second fuel assembly comprising only said second fuel rods, and the ratio of the number of said first fuel assemblies to that of the second fuel assemblies in the group surrounding each said control rod being 1:3.

5. A structure of a nuclear reactor core as claimed in claim 4, wherein said fissile material is uranium235.

6. A structure of a nuclear reactor core as claimed in claim 5, wherein said burnable poison is selected from the group consisting of gadolinium, hafnium, europium and compounds thereof.

7. A structure of a nuclear reactor core as claimed in claim 4, wherein said first fuel assemblies have an exposure degree less than that of said second fuel assemblies.

8. A structure of a nuclear reactor core as claimed in claim 7, wherein said second fuel assemblies in the group surrounding each said control rod have different exposure degrees from one another.

9. A structure of a nuclear reactor core as claimed in claim 4, wherein said fissile material is uranium-235.

10. A structure of a nuclear reactor core as claimed in claim 9, wherein said burnable poison is selected from the group consisting of gadolinium, hafnium, europium and compounds thereof.

11. A structure of a nuclear reactor core as claimed in claim 1 or 4, wherein in each of said first fuel assemblies having said first fuel rods, the concentration of said burnable poison contained in said first fuel rods and the number of said first fuel rods, at the beginning of an exposure cycle, is so selected that said burnable poison is completely diminished at the end of the same exposure cycle.

12. A structure of a nuclear reactor core as claimed in claim 1 or 4, wherein the nuclear reactor core is the core of a boiling water reactor.

13. In a structure of a nuclear reactor core having an axis, and axially upper and lower regions and radially central and peripheral regions, and loaded with fuel assemblies each extending substantially parallel with said axis, said fuel assemblies comprising a plurality of first fuel assemblies which respectively have a plurality of first fuel rods each packed with a fissile material containing a burnable poison and a plurality of second fuel rods each packed with the fissile material without burnable poison, and a plurality of second fuel assemblies which respectively have a plurality of said second fuel rods and no first fuel rods, the improvement comprising both said first and second fuel assemblies each having an upper part which are separated at the axial middle thereof, said lower part being arranged to be within said axially lower region and having therein the fissile material of a uniform enrichment, and said upper part being arranged to be within said axially upper region and having the fissile material of a uniform enrichment more abundant than that in said lower part, each said first fuel assembly having a plurality of said first fuel rods including one group of said first fuel rods having respectively axially upper and lower ends and an axial middle, and being packed with the fissile material containing the burnable poison having concentration decreasing from said axial middle toward said upper and lower ends, and the remaining first fuel rods of said first fuel assemblies having respectively axially upper and lower end portions and an axially middle portion, said axially upper and lower end portions being packed with the fissile material without burnable poison, and said axially middle portion being packed with the fissile material containing the burnable poison, said first fuel assemblies being distributed over said nuclear reactor core in such a way that the concentration of a burnable poison and the number of said first fuel rods in said first fuel assembly are larger in said radially central region than in said peripheral region.

14. A structure of a nuclear reactor core as claimed in claim 13, further comprising control rods each surrounded by a group of four fuel assemblies formed of a combination of said first and second fuel assemblies, and the ratio of the number of said first fuel assemblies to that of the second fuel assemblies in the group surrounding each said control rod being 1:3.

15. A structure of a nuclear reactor core as claimed in claim 13 or 14, wherein the nuclear reactor core is the core of a boiling water reactor.

* * * * *